United States Patent
Suzuki (10) Patent No.: US 7,255,014 B2
(45) Date of Patent: Aug. 14, 2007

(54) WHEEL BEARING APPARATUS INCORPORATED WITH A WHEEL SPEED DETECTING APPARATUS

(75) Inventor: Syougo Suzuki, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 11/386,986

(22) Filed: Mar. 22, 2006

(65) Prior Publication Data

US 2006/0213288 A1 Sep. 28, 2006

(30) Foreign Application Priority Data

Mar. 22, 2005 (JP) .............................. 2005-081813

(51) Int. Cl.
 *G01L 3/14* (2006.01)
(52) U.S. Cl. ................................. 73/862.321
(58) Field of Classification Search ............ 73/862.321
 See application file for complete search history.

(56) References Cited

U.S. PATENT DOCUMENTS

| | | | | |
|---|---|---|---|---|
| 5,967,669 | A * | 10/1999 | Ouchi | ......................... 384/448 |
| 6,127,819 | A * | 10/2000 | Ouchi | ......................... 324/173 |
| 6,375,359 | B1 * | 4/2002 | Miyazaki | .................... 384/448 |
| 6,894,484 | B2 * | 5/2005 | Takizawa et al. | ........... 324/174 |

FOREIGN PATENT DOCUMENTS

JP 2003-254985 9/2003

* cited by examiner

*Primary Examiner*—Michael Cygan
*Assistant Examiner*—O. Davis
(74) *Attorney, Agent, or Firm*—Harness, Dickey & Pierce, P.L.C.

(57) ABSTRACT

A wheel bearing apparatus has a wheel speed detecting apparatus which can prevent ingress of foreign matter into the wheel speed detecting portion of the wheel bearing apparatus. The wheel bearing apparatus has an encoder (19) mounted on the outer circumferential surface of an inner ring (6). A sensor holder (15) is arranged on the end of the outer member (4) opposite to the encoder (19). The sensor holder (15) includes an annular fitting member (16) and a holding portion (17). The holding portion (17) is formed by synthetic resin molded integrally with the annular fitting member (16). A wheel speed detecting sensor (20) is embedded in the resin and is positioned opposite to the encoder (19), via a predetermined gap between the two. A seal (11) is arranged at the inboard side of the encoder (19). The seal (11) includes a first sealing plate (21) and a second sealing plate (22) fit, respectively, on the sensor holder (15) and the inner ring (6). The tip end (26) of the annular fitting member (16) is enveloped by plastic resin that forms the holding portion (17).

5 Claims, 6 Drawing Sheets

PRIOR ART

WHEEL BEARING APPARATUS INCORPORATED WITH A WHEEL SPEED DETECTING APPARATUS

CROSS-REFERENCE TO RELATED APPLICATION

This application claims priority to Japanese Patent Application No. 2005-081813, filed Mar. 22, 2005, which application is herein expressly incorporated by reference.

FIELD

The present disclosure relates to a vehicle wheel bearing apparatus and, more particularly, to a wheel bearing apparatus which incorporates a wheel speed detecting apparatus to detect rotational speed of the vehicle wheel.

BACKGROUND

Wheel bearing apparatus is generally known which supports a vehicle wheel relative to a suspension apparatus and which incorporates a wheel speed detecting apparatus to detect rotational speed of the vehicle wheel. The detecting apparatus detects the wheel speed to control the anti-lock braking system (ABS). Such a bearing apparatus generally includes a wheel speed detecting apparatus with a magnetic encoder. The encoder has magnetic poles alternately arranged along its circumferential direction. The magnets are integrated in a sealing apparatus arranged between inner and outer members to contain rolling elements (balls or rollers). A wheel speed detecting sensor detects the variation in the magnetic poles of the magnetic encoder according to the rotation of the wheel.

The wheel speed sensor is usually mounted on a knuckle after the wheel bearing apparatus has been mounted on the knuckle to form a suspension apparatus. Wheel bearing apparatus with a wheel speed detecting apparatus have recently been proposed where a wheel speed detecting sensor is self-contained within the wheel bearing. This reduces the size of the wheel bearing apparatus as well as eliminates troublesome in air gap adjustment between the wheel speed sensor and the magnetic encoder.

Figure 5:
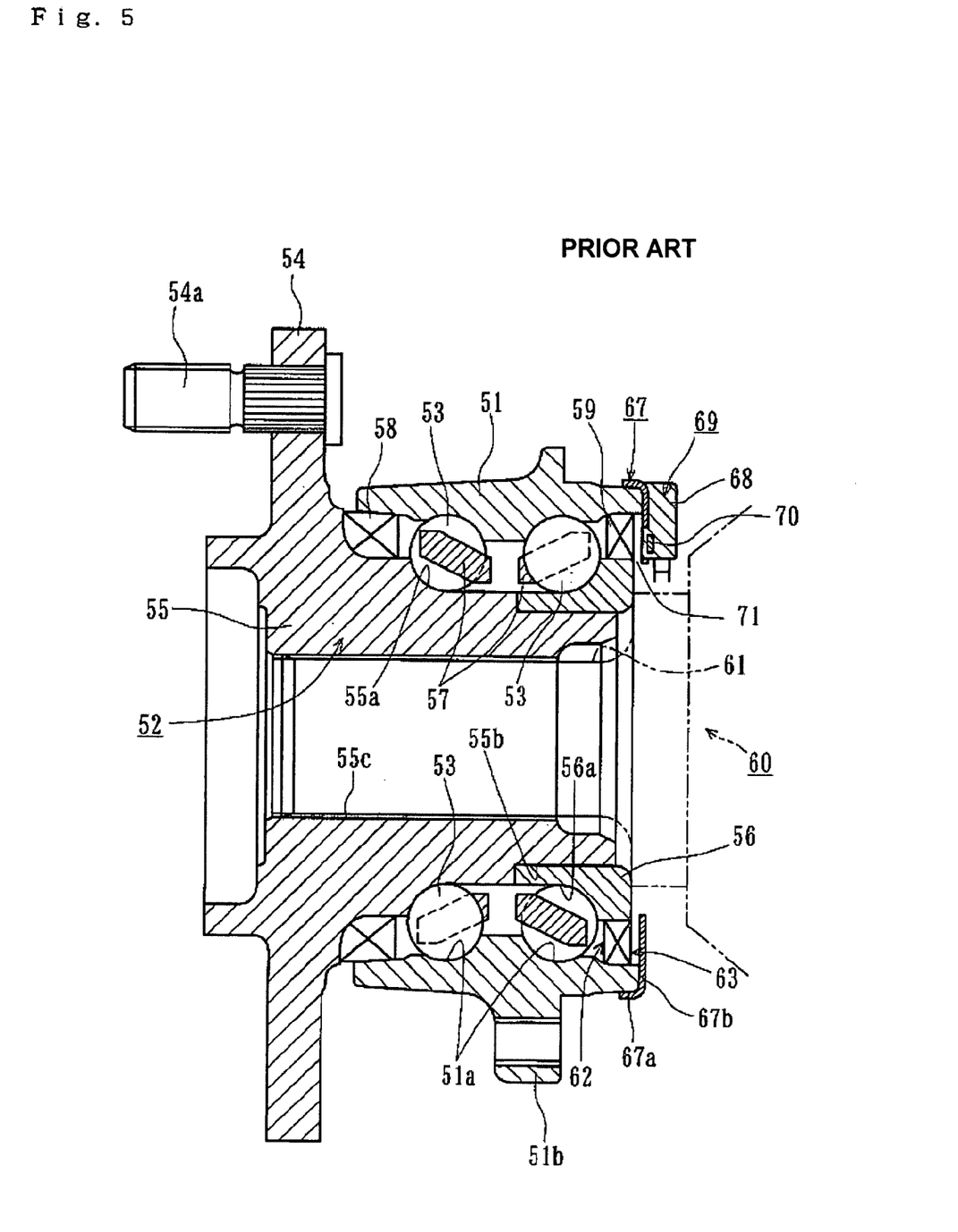
FIG. 5 is a longitudinal-section view of a prior art wheel bearing apparatus with a wheel speed detecting apparatus.

An example of a wheel bearing apparatus with a wheel speed detecting apparatus known in the prior art (e.g. Japanese Laid-open Patent Publication No. 2003-254985) is shown in FIG. 5. This wheel bearing apparatus with a wheel speed detecting apparatus includes an outer member 51 which forms a stationary member secured on a suspension apparatus (not shown). An inner member 52, which includes a wheel hub 55 and an inner ring 56, is inserted into the outer member 51 via double row rolling elements (balls) 53 and 53 therebetween. The outer member 51 has an integrally formed wheel mounting flange at one end and double row outer raceway surfaces 51a and 51a formed on its inner circumferential surface. The inner member 52 has double row inner raceway surfaces 55a and 56a opposite to the double row outer raceway surfaces 51a and 51a. One (55a) of the double row inner raceway surfaces is formed on the outer circumferential surface of the wheel hub 55. The other (56a) is formed on the outer circumferential surface of the inner ring 6. The inner ring is press-fit on the hub cylindrical portion 55b extending axially away from the inner raceway surface 55a of the wheel hub 55. Double row rolling elements 53 and 53, held by cages 57, 57, are arranged between the outer and inner raceway surfaces 51a and 51a; 55a and 56a, respectively.

The wheel hub 55 has an integrally formed wheel mounting flange 54 to mount a wheel (not shown). Hub bolts 54a, to secure the wheel, are rigidly secured on the wheel mount flange 54 at an equidistant along its periphery. A serration 55c is formed on the inner circumferential surface of the wheel hub 55. A stem portion 61 of an outer joint member 60, which forms a part of a constant velocity universal joint (not shown), is inserted into the wheel hub serration 55. Seals 58 and 59 are arranged at both ends of the outer member 51 to prevent leakage of grease contained within the bearing as well as ingress of rain water or dust into the bearing.

Figure 6:
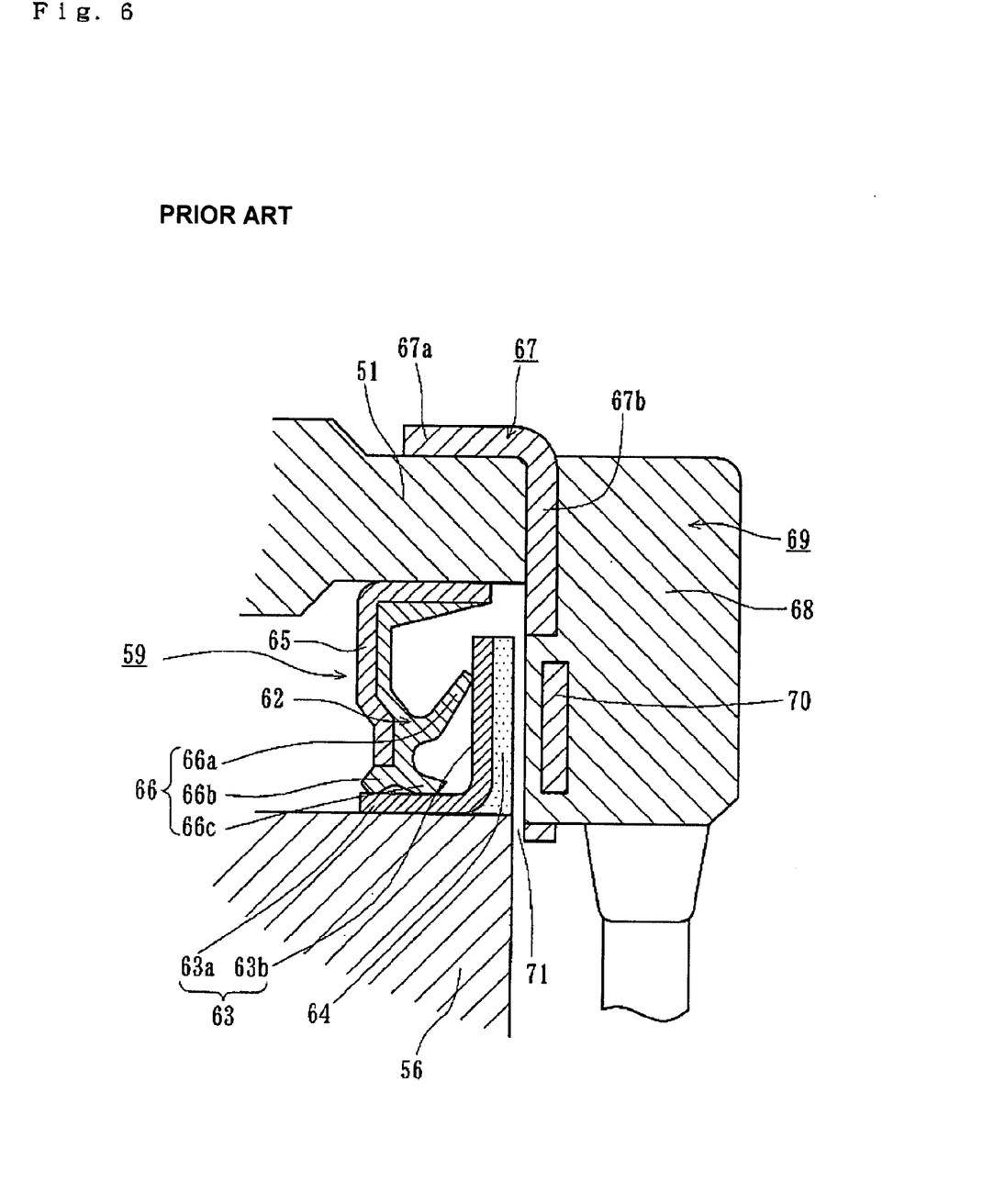
FIG. 6 is a partially enlarged longitudinal-section view of FIG. 5.

The seal 59 on the inboard side, as shown in an enlarged view of FIG. 6, is fit into the inner circumference at the end of the outer member 51. The seal 59 includes a first sealing plate 62 and a second sealing plate 63 having a "L"-shaped cross-section. The second sealing plate 63 has a cylindrical portion 63a fit onto the outer circumference of the inner ring 56. A standing portion 63b extends radially outward from the cylindrical portion 63a. A magnetic encoder 64 is adhered, via vulcanized adhesion, on the outer surface of the standing portion 63b. The magnetic encoder 64 is formed from a rubber magnet in which magnetic N and S poles are alternately arranged along the circumferential direction.

The first sealing plate 62 includes a metal core 65 having a substantially "L"-shaped cross-section. A sealing member 66, including a side lip 66a, is in sliding contact with the inner side surface of the standing portion 63b of the second sealing plate 63. A pair of radial lips 66b and 66c is in sliding contact with the cylindrical portion 63a of the second sealing plate 63.

An annular sensor holder 69 is mounted on one end of the outer member 51. The annular sensor holder 69 includes a fitting cylinder 67 and a holding portion 68 connected to the fitting cylinder 67. The fitting cylinder 67 has an annular configuration with an "L"-shaped cross-section. The fitting cylinder 67 includes a cylindrical portion 67a and a flange portion 67b, which extends radially inward from the cylindrical portion 67a.

The holding portion 68 is made from synthetic resin molded into an annular body. A wheel speed sensor 70 is embedded into the resin. The wheel speed sensor 70 is arranged opposite to a magnetic encoder 64 with a predetermined air gap between the two. The wheel speed sensor 70 includes a magnetic detecting element, such as a Hall element, a magnetic resistance element (MR element) etc., which changes characteristics in accordance with the flowing direction of the magnetic flux. Also included is an IC with a waveform shaping circuit to shape the output waveform of the magnetic detecting element.

A labyrinth seal is formed by a small gap 71 arranged between the flange portion 67b of the fitting cylinder 67 and the opposed end surface of the inner ring 56. The seal prevents ingress of foreign matter, such as magnetic powder, into a space between the magnetic encoder 64 and the detecting portion of the wheel speed sensor 70 from outside of the bearing apparatus and before the stem portion 61 of the outer joint member 60 is inserted into the wheel hub 55, which includes a course where the bearing apparatus is transferred to an assemble line of an automobile manufacturer. Accordingly, this improves the detecting reliability of the rotational speed of the wheel.

Although the wheel bearing apparatus incorporated with a wheel speed detecting apparatus of the prior art has superior effects mentioned above, it is impossible to prevent ingress of foreign matter, such as magnetic powder, into a space between the magnetic encoder 64 and the detecting portion of the wheel speed sensor 70 from outside of the bearing apparatus and under severe circumstances during real running of the vehicle.

SUMMARY

It is, therefore, an object of the present disclosure to provide a wheel bearing apparatus with a wheel speed detecting apparatus which is small in size and can prevent ingress of foreign matter into the wheel speed detecting region. Thus, this improves the durability as well as the reliability of the detector.

According to the present disclosure, a wheel bearing apparatus with a wheel speed detecting apparatus comprises an outer member with an integrally formed body mounting flange. Double row outer raceway surfaces are formed on the inner circumferential surface of the outer member. An inner member includes a wheel hub, formed with an integral wheel mounting flange at one end and a cylindrical portion axially extending from the wheel mount flange, and an inner ring fit on the cylindrical portion of the wheel hub. Double row inner raceway surfaces are formed on the outer circumferential surfaces of the wheel hub and inner ring, respectively, opposite to the double row outer raceway surfaces. Double row rolling elements are arranged between the outer and inner raceway surfaces. An encoder is mounted on the outer circumferential surface of the inner ring. A sensor holder is arranged on the end of the outer member opposite to the encoder. The sensor holder includes an annular fitting member and a holding portion formed from synthetic resin molded integrally with the annular fitting member. A wheel speed detecting sensor is embedded in the resin and is positioned opposite to the encoder, via a predetermined gap. The encoder has its characteristics varying alternately and equidistantly along its circumferential direction. A seal is arranged at the inboard side of the encoder. The seal includes a first sealing plate and a second sealing plate fit, respectively, on the annular fitting member and the inner ring. The plates are arranged opposite to one another. The tip end of the annular fitting member engages the holding portion.

The wheel bearing apparatus with a wheel speed detecting apparatus comprises an encoder mounted on the outer circumferential surface of the inner ring. A sensor holder is arranged on the end of the outer member opposite to the encoder. The holder includes an annular fitting member and a holding portion formed from synthetic resin molded integrally with the annular fitting member. A wheel speed detecting sensor is embedded in the resin and arranged opposite to the encoder, via a predetermined gap. The encoder has its characteristics varying alternately and equidistantly along its circumferential direction. A seal is arranged at the inboard side of the encoder. The seal includes a first sealing plate and a second sealing plate fit, respectively, on the annular fitting member and the inner ring and arranged to oppose one another. The tip end of the annular fitting member engages the holding portion. Thus, it is possible to prevent ingress of foreign matter, such as magnetic powder, into a space between the magnetic encoder and the detecting portion of the wheel speed sensor from outside of the bearing apparatus although before the stem portion of the outer joint member is inserted into the wheel hub, which includes a course where the bearing apparatus is transferred to an assemble line of an automobile manufacturer and also under severe circumstances during real running of the vehicle. Thus, it is also possible to increase the strength of the connection between the annular fitting member and the holding portion. This remarkably improves the detection reliability of the wheel rotation speed.

The annular fitting member includes a cylindrical fitting portion press fit onto the outer circumferential surface of the outer member. A flange portion extends radially inward from the fitting portion. The flange portion is adapted to contact with the end face of the outer member. A cylindrical portion extends axially from the flange portion. The first sealing plate is fit into the cylindrical portion. Thus, it is possible to reduce the radial size of the wheel bearing apparatus and to simplify the structure of the wheel speed sensor and its associated parts. This further improves the workability of the assemble.

The tip end of the cylindrical portion of the annular fitting member extends radially outward from the cylindrical portion in an inclined direction. The plastic resin, forming the holding portion, is molded so that it envelopes the tip end of the cylindrical portion. The annular fitting member has an engaging portion which extends radially outward from the cylindrical portion. Alternatively, the tip end of the engaging portion is caulked onto the holding portion after the holding portion has been molded onto the annular fitting member. Thus, it is possible to increase the strength of the connection between the annular fitting member and the holding portion. Thus, this prevents separation of the two due to vibration of the wheel bearing apparatus during transportation and handling.

The second sealing plate has a substantially "L" shaped cross-section. A cylindrical portion is adapted to fit into the inner ring. A standing portion extends radially outward from the cylindrical portion. Sealing lips of a sealing member are mounted on the first sealing plate. The lips slidably contact the second sealing plate. Thus, it is possible to improve the sealability of the wheel bearing apparatus. This prevents leakage of grease contained within the bearing as well as ingress of rain water or dust into the bearing.

The wheel bearing apparatus with a wheel speed detecting apparatus comprises an outer member with an integrally formed body mounting flange. Double row outer raceway surfaces are formed on the inner circumferential surface of the outer member. An inner member includes a wheel hub with an integrally formed wheel mounting flange at one end and a cylindrical portion axially extending from the wheel mount flange. An inner ring is fit onto the cylindrical portion of the wheel hub. Double row inner raceway surfaces are formed on the outer circumferential surfaces of the wheel hub and inner ring, respectively, opposite of the double row outer raceway surfaces. Double row rolling elements are rotatably arranged between the outer and inner raceway surfaces. An encoder is mounted on the outer circumferential surface of the inner ring. A sensor holder is arranged on the end of the outer member opposite to the encoder. The holder includes an annular fitting member and a holding portion formed from synthetic resin molded integrally with the annular fitting member. A wheel speed detecting sensor is embedded in the resin and positioned opposite of the encoder, via a predetermined gap. The encoder has its characteristics varying alternately and equidistantly along its circumferential direction. A seal is arranged at the inboard side of the encoder. The seal includes a first sealing plate and a second sealing plate fit, respectively, on the annular fitting member and the inner ring and arranged opposite to each other. The tip end of the annular fitting member engages the holding portion. Accordingly, it is possible to prevent ingress of foreign matter, such as magnetic powder, into a space between the magnetic encoder and the detecting portion of the wheel speed sensor from the outside of the bearing apparatus although before the stem portion of the outer joint member is inserted into the wheel hub, which includes a course where the bearing apparatus is transferred to an assemble line of an automobile manufacturer, and also under severe circumstances during real running of the vehicle. Thus, it is also possible to increase the strength of the connection between the annular fitting member and the holding portion. Thus, this remarkably improves the detection reliability of the wheel rotational speed.

A wheel bearing apparatus incorporated with a wheel speed detecting apparatus comprises an outer member with an integrally formed body mounting flange. Double row outer raceway surfaces are formed on the inner circumferential surface of the outer member. An inner member includes a wheel hub with an integrally formed wheel mounting flange at one end and a cylindrical portion axially extending from the wheel mount flange. An inner ring is fit onto the cylindrical portion of the wheel hub. Double row inner raceway surfaces are formed on the outer circumferential surfaces of the wheel hub and inner ring, respectively, opposite to the double row outer raceway surfaces. Double row rolling elements are rotatably arranged between the outer and inner raceway surfaces. An encoder is mounted on the outer circumferential surface of the inner ring. A sensor holder is arranged on the end of the outer member opposite to the encoder. The holder includes an annular fitting member and a holding portion formed from synthetic resin molded integrally with the annular fitting member. A wheel speed detecting sensor is embedded in the resin and is positioned opposite to the encoder, via a predetermined gap. The encoder has its characteristics varying alternately and equidistantly along its circumferential direction. A seal is arranged at the inboard side of the encoder. The seal includes a first sealing plate and a second sealing plate fit, respectively, on the annular fitting member and the inner ring and arranged to oppose one another. The tip end of the annular fitting member engages the holding portion.

Further areas of applicability will become apparent from the description provided herein. It should be understood that the description and specific examples are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

DETAILED DESCRIPTION

Preferred embodiments of the present disclosure will be described with reference to accompanied drawings.

Figure 1:
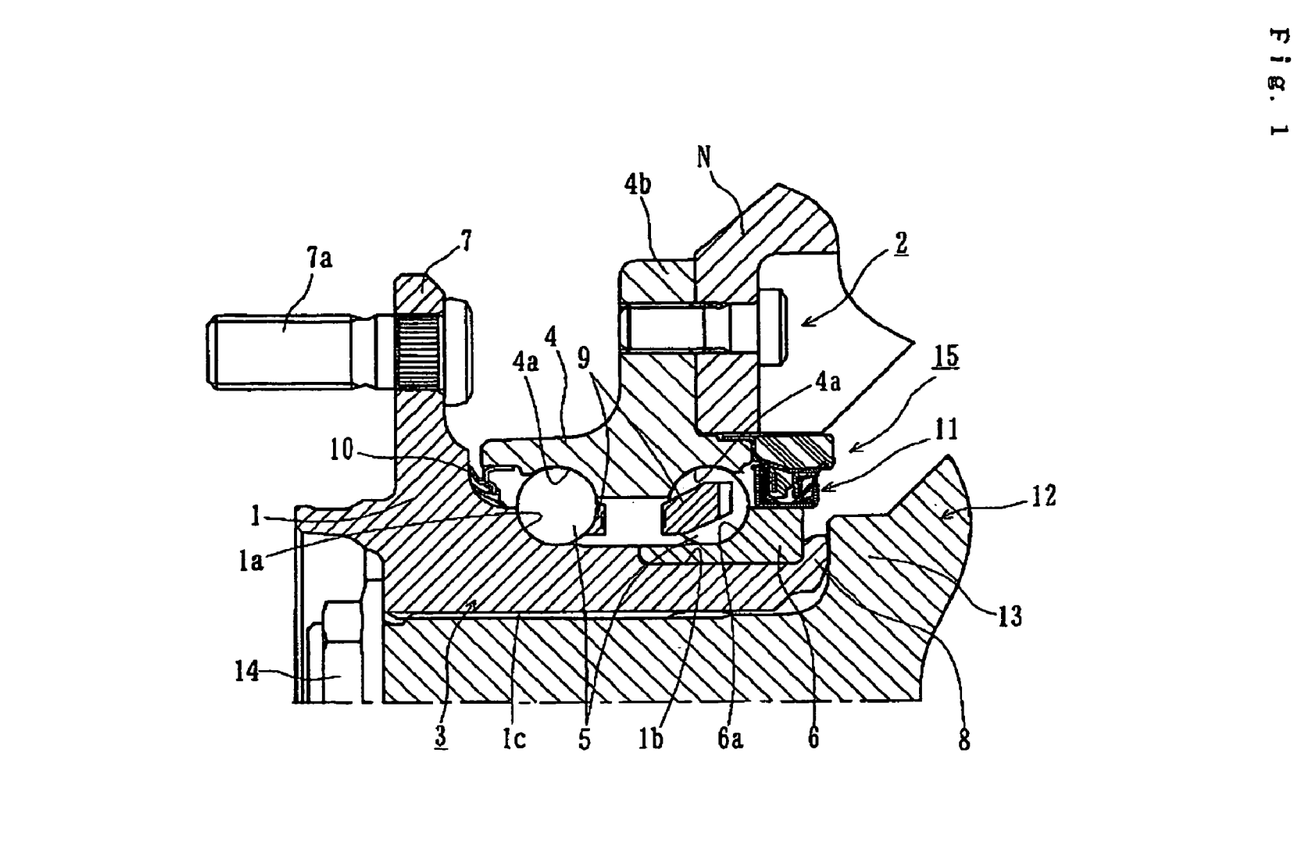
FIG. 1 is a longitudinal-section view of a first embodiment of a wheel bearing apparatus with a wheel speed detecting apparatus.
Figure 2:
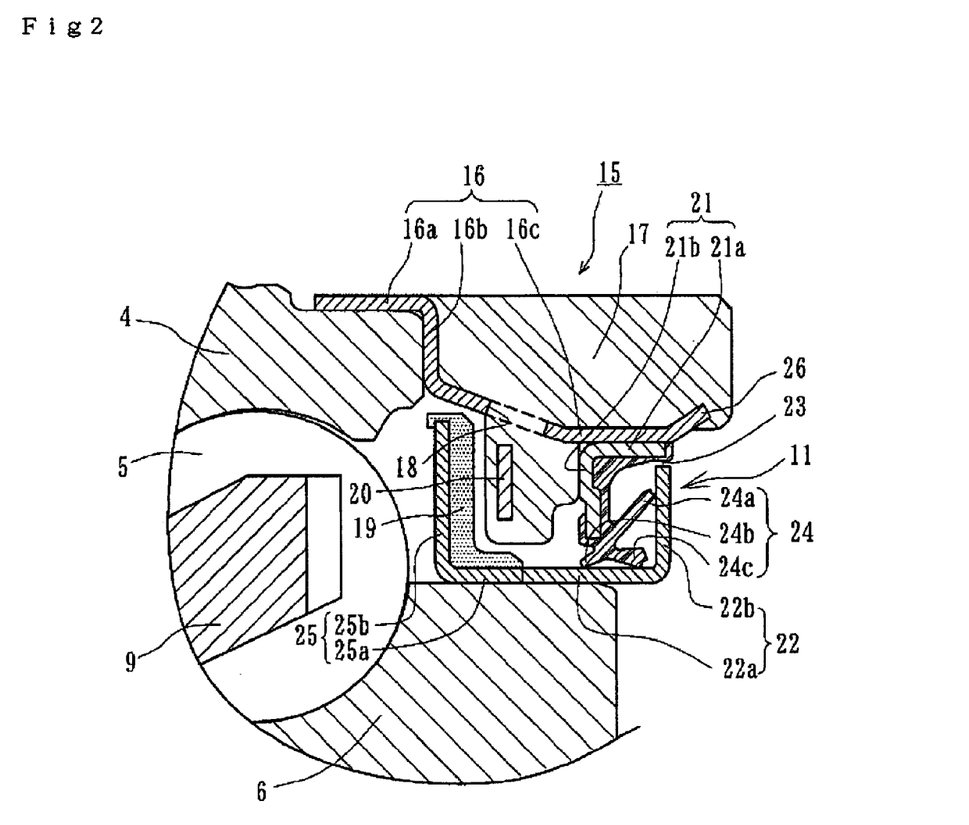
FIG. 2 is a partially enlarged longitudinal-section view of FIG. 1.

FIG. 1 is a longitudinal-section view of a first embodiment of a wheel bearing apparatus with a wheel speed detecting apparatus. FIG. 2 is a partially enlarged longitudinal-section view of FIG. 1. In the description of the present disclosure, an outer side of a bearing apparatus, when it is mounted on a vehicle, is referred to as the "outboard" side (the left side in the drawing). An inner side of the bearing apparatus, when it is mounted on a vehicle, is referred to as the "inboard" side (the right side in the drawing).

The wheel bearing apparatus with a wheel speed detecting apparatus for a driving wheel where a wheel hub 1 and a double row rolling bearing 2 are formed as a unit arrangement. Thus, it has a so-called "third generation" structure.

The double row rolling bearing 2 includes an outer member 4, an inner member 3, and double row rolling elements (balls) 5 and 5. The outer member 4 is made of medium carbon steel including carbon of 0.40~0.80 wt % by weight. A body mounting flange 4b is integrally formed at its outer circumferential surface. The body mounting flange 4b is adapted to be mounted on a knuckle N. Also, double row outer raceway surfaces 4a and 4a are formed on its inner circumferential surface. The double row outer raceway surfaces 4a and 4a are hardened by high frequency induction quenching to have a surface hardness of 54~64 HRC.

The inner member 3 includes the wheel hub 1 and an inner ring 6 press fit onto the wheel hub 1. The wheel hub 1 is integrally formed with a wheel mounting flange 7. The flange 7 mounts a wheel (not shown) at its outboard end. Hub bolts 7a secure it. The bolts 7a are circumferentially and equidistantly positioned about the flange 7. The outer circumferential surface of the wheel hub 1 is formed with one inner raceway surface 1a (outboard side) corresponding to one of the double row outer raceway surfaces 4a and 4a. A cylindrical portion 1b extends axially from the inner raceway surface 1a.

The inner ring 6 is press-fit onto the cylindrical portion 1b via a predetermined interference fit. The inner ring 6 is formed with the other inner raceway surface 6a (inboard side) corresponding to the other of the double row outer raceway surfaces 4a and 4a. The inner ring 6 is axially immovably secured relative to the wheel hub 1 by the caulked portion 8. The caulked portion 8 is formed by plastically deforming the cylindrical portion 1b of the wheel hub 1. Thus, a so-called self-retaining structure is formed. The self-retaining structure enables a reduction in weight and size of the bearing apparatus. This is due to the fact that it is unnecessary to control an amount of preload on the bearing apparatus by tightly fastening the inner ring 6 using a nut as in a conventional manner.

The double row rolling elements 5 and 5 are contained between the outer member outer raceway surfaces 4a and 4a and the oppositely arranged inner raceway surfaces 1a and 6a. The rolling elements 5 are held by cages 9 and 9. Seals 10 and 11 are arranged at the ends of the outer member 4 to prevent leakage of grease contained within the bearing apparatus as well as ingress of rain water or dust into the bearing.

The wheel hub 1 is made of medium carbon steel such as S53C including carbon of 0.40~0.80 wt % by weight. The wheel hub 1 is formed with a hardened layer having a surface hardness of about 54~64 HRC, by high frequency induction hardening. The hardened surface is from the seal land portion, to which the outboard seal 10 sliding contacts, to the inner raceway surface 1a and cylindrical portion 1b. The caulked portion 8 is not heat treated. The caulked portion 8 has its surface hardness of less than or equal to 25 HRC. Thus, it is possible not only to improve the wear resistance of the seal land forming the base of the wheel mounting flange 7 but to provide a sufficient mechanical strength against the rotary bending load applied to the wheel mount flange 7. Thus, this improves the durability of the wheel hub 1. In addition, it is possible to improve the workability of the caulked portion 8 during plastic deformation and to prevent the generation of cracks during deformation. Thus, this improves the quality reliability.

The wheel hub 1 is formed with a serration (or spline) 1c on its inner peripheral surface. An outer joint member 12, forming a constant velocity universal joint, is inserted into the serration 1c. A shoulder 13 on the outer joint member 12 abuts the caulked portion 8 of the wheel hub 1. The outer joint member 12 is axially secured with the wheel hub 1 by a nut 14.

A sensor holder 15 is fit on the inboard end of the outer member 4 as shown in FIG. 2. The sensor holder 15 includes an annular fitting member 16 and a holding portion 17. The annular fitting member 16 is formed wholly as an annular body. The annular fitting member 16 includes a cylindrical fitting portion 16a press-fit on the outer circumferential surface of the outer member 4. A flange portion 16b extends radially inward from the fitting portion 16a. The flange portion 16b is adapted to be in close contact with the end surface of the outer member 4. A cylindrical portion 16c extends axially from the flange portion 16b. The annular fitting member 16 is press-formed from stainless steel having corrosion resistance. The holding portion 17 is integrally molded with the annular fitting member 16. Several apertures 18 are provided on the cylindrical portion 16c to enable the holding portion to pass through the fitting member 16. The seal 11 is arranged between the cylindrical portion 16c and the inner ring 6. The sensor holder 15 is press fit onto the inboard end of the outer member 4. The flange portion 16b of the annular fitting member 16 is in close contact with the end face of the outer member 4.

A wheel speed detecting sensor 20 is embedded within the holding portion 17. The detecting sensor 20 is positioned opposite to a magnetic encoder 19, via a predetermined radial gap between the two. The wheel speed sensor 20 includes a magnetic detecting element such as a Hall element, a magnetic resistance element (MR element) etc. which changes characteristics in accordance with the flowing direction of the magnetic flux. Also, an IC, with a waveform shaping circuit for shaping the output waveform of the magnetic detecting element, is incorporated with the sensor 20.

The inboard seal 11 has first and second annular sealing plates 21 and 22. Each plate has a substantially "L"-shaped cross-sectional configuration and are arranged to oppose one another. The second sealing plate 22 includes a cylindrical portion 22a press fit onto the inner ring 6. A standing portion 22b extends radially outward from the cylindrical portion 22a. The tip of the standing portion 22b opposes the cylindrical portion 21a of the first sealing plate 21, via a small radial gap, and forms a labyrinth seal 23. The second sealing plate 22 is made by press-forming austenitic stainless steel sheet (JIS SUS 304 etc.) or preserved cold rolled sheet (JIS SPCC etc.).

The first sealing plate 21 includes a cylindrical portion 21a press fit into the cylindrical potion 16c of the annular fitting member 16 of the sensor holder 15. A standing portion 21b extends radially inward from one end of the cylindrical portion 21a. A sealing member 24, having a side lip 24a, grease lip 24b and a medium lip 24c made of elastic material such as rubber etc., is adhered to the sealing plate 21, via vulcanized adhesion. The side lip 24a is in sliding contact with the standing portion 22b of the second sealing plate 22. The grease lip 24b and medium lip 24c are in sliding contact with the cylindrical portion 22a of the second sealing plate 22.

A steel base 25 is arranged at the outboard side of the seal 11 opposite to and sandwiching the holding portion 17 of the sensor holder 15. The base 25 includes a cylindrical portion 25a adapted to be press fit onto the inner ring 6 and a standing portion 25b extending radially outward from the cylindrical portion 25a. The steel base 25 is made by press-forming a ferritic stainless steel sheet (JIS SUS 430 etc.) or preserved cold rolled sheet (JIS SPCC etc.). A magnetic encoder 19 is adhered, via vulcanized adhesion, onto the outboard side surface of the standing portion 25b. The magnetic encoder 19 is formed from an elastomer such as rubber etc. which includes mixed or mingled magnetic powder. The magnetic encoder 19 has N and S poles, alternately arranged along its circumference direction. The magnetic encoder forms a rotary encoder to detect the wheel rotational speed.

According to this embodiment, since the holding portion 17 is integrally molded with the annular fitting member 16, the wheel speed sensor 20 is embedded in the holding portion 17. The seal 11 is fit into the inboard side of the sensor 20. The magnetic encoder 19 is arranged at the outboard side of the seal 11 with the holding portion 17 sandwiched therebetween. Thus, it is possible to prevent ingress of foreign matter, such as magnetic powder, into a space between the magnetic encoder and the detecting portion of the wheel speed sensor from the outside of the bearing apparatus although before the stem portion of the outer joint member is inserted into the wheel hub, which includes a course where the bearing apparatus is transferred to an assemble line of an automobile manufacturer, and also under severe circumstances during real running of the vehicle. Thus, it is possible to improve the detection reliability of the wheel speed. Also, it is possible to reduce the radial size of the wheel bearing apparatus and to simplify the structure of the wheel speed sensor and its associated parts. This further improves the workability of the assemble.

The tip end 26 of the cylindrical portion 16c of the annular fitting member 16 extends radially outward on an incline from the cylindrical portion 16c. The plastic resin forming the holding portion 17, as it is molded, envelopes the tip end 26 of the cylindrical portion 16c. Thus, it is possible to increase the strength of connection between the annular fitting member 16 and the holding portion 17. This prevents separation of the two due to vibration of the wheel bearing apparatus during transportation and handling.

Although it is exemplary shown in this embodiment that the wheel rotation speed sensor 20 includes the magnetic encoder 19 and the magnetic detecting element such as Hall effect element, the wheel speed detecting apparatus is not limited to such a structure and may be a passive type apparatus comprising a magnetic encoder, magnets, or annular coils, etc. Also, although it is exemplary shown in this embodiment as a wheel bearing apparatus for a driving side wheel, the present disclosure can be applied to a wheel bearing apparatus for a driven side wheel if it has an inner ring rotation type structure.

Figure 3:
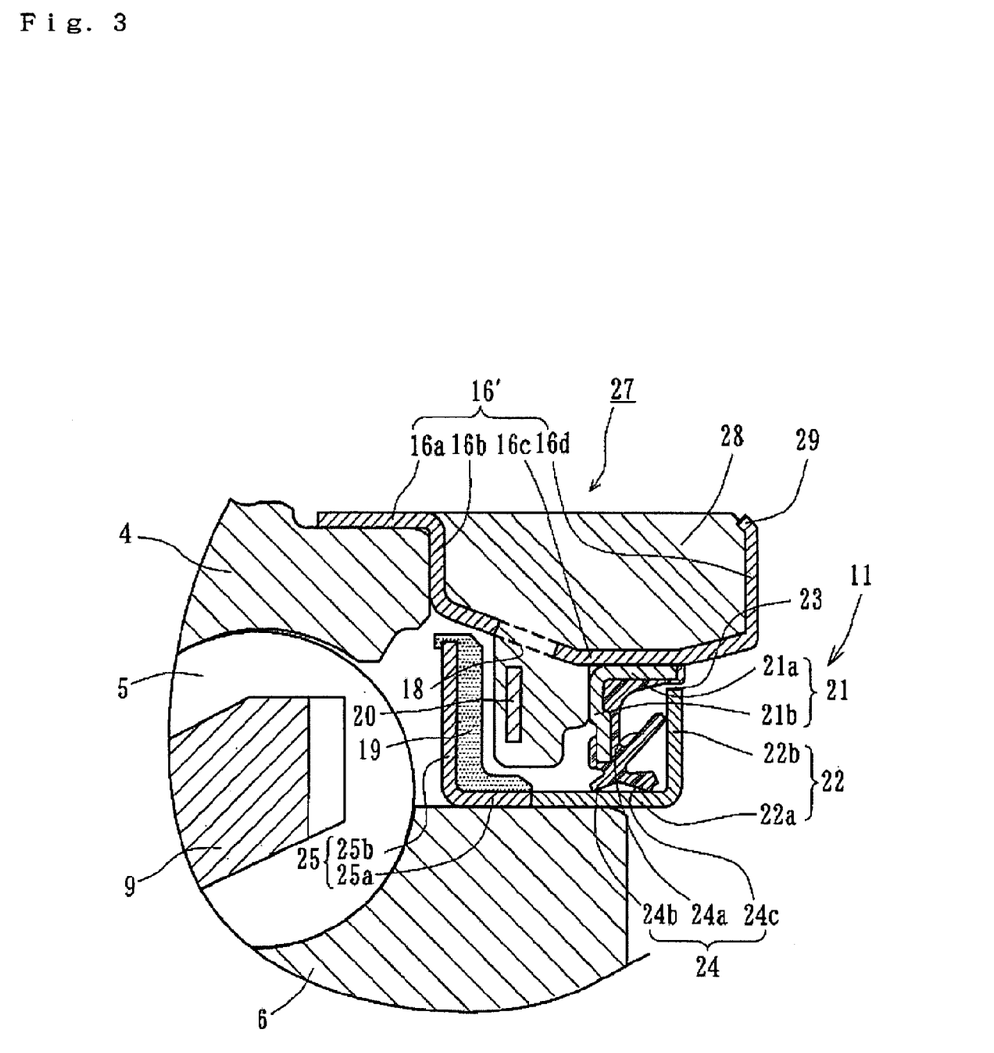
FIG. 3 is a partially enlarged longitudinal-section view of a second embodiment of a wheel bearing apparatus with a wheel speed detecting apparatus.

FIG. 3 is an enlarged view of a second embodiment of the wheel bearing apparatus with a wheel speed detecting apparatus. This second embodiment is different from the first embodiment only in the structure of the annular fitting member. Accordingly, same reference numerals are also used in the second embodiment to designate the same parts performing the same functions of the parts as those used in the first embodiment.

A sensor holder 27 includes an annular fitting member 16' and a holding portion 28 integrally formed with the annular fitting member 16'. The annular fitting member 16' is formed wholly as an annular body. The annular fitting member 16' includes a cylindrical fitting portion 16a press-fit onto the outer circumferential surface of the outer member 4. A flange portion 16b extends radially inward from the fitting portion. A cylindrical portion 16c extends axially from the flange portion 16b. An upstanding engaging portion 16d extends radially outward from the cylindrical portion 16c. The holding portion 28 is integrally molded with the annular fitting member 16' by providing several apertures 18 on the cylindrical portion 16c. The seal 11 is arranged between the cylindrical portion 16c of the annular fitting member 16' of the sensor holder 27 and the inner ring 6. The sensor holder 27 is press fit onto the inboard end of the outer member 4. The flange portion 16b of the annular fitting member 16' is in close contact with the end face of the outer member 4.

The tip end 29 of the engaging portion 16d of the annular fitting member 16' is caulked onto the holding portion 28 after the holding portion 28 has been molded onto the annular fitting member 16'. Thus, it is possible to increase the strength of the connection between the annular fitting member 16' and the holding portion 28. This prevents separation of the two similarly to the first embodiment.

Figure 4:
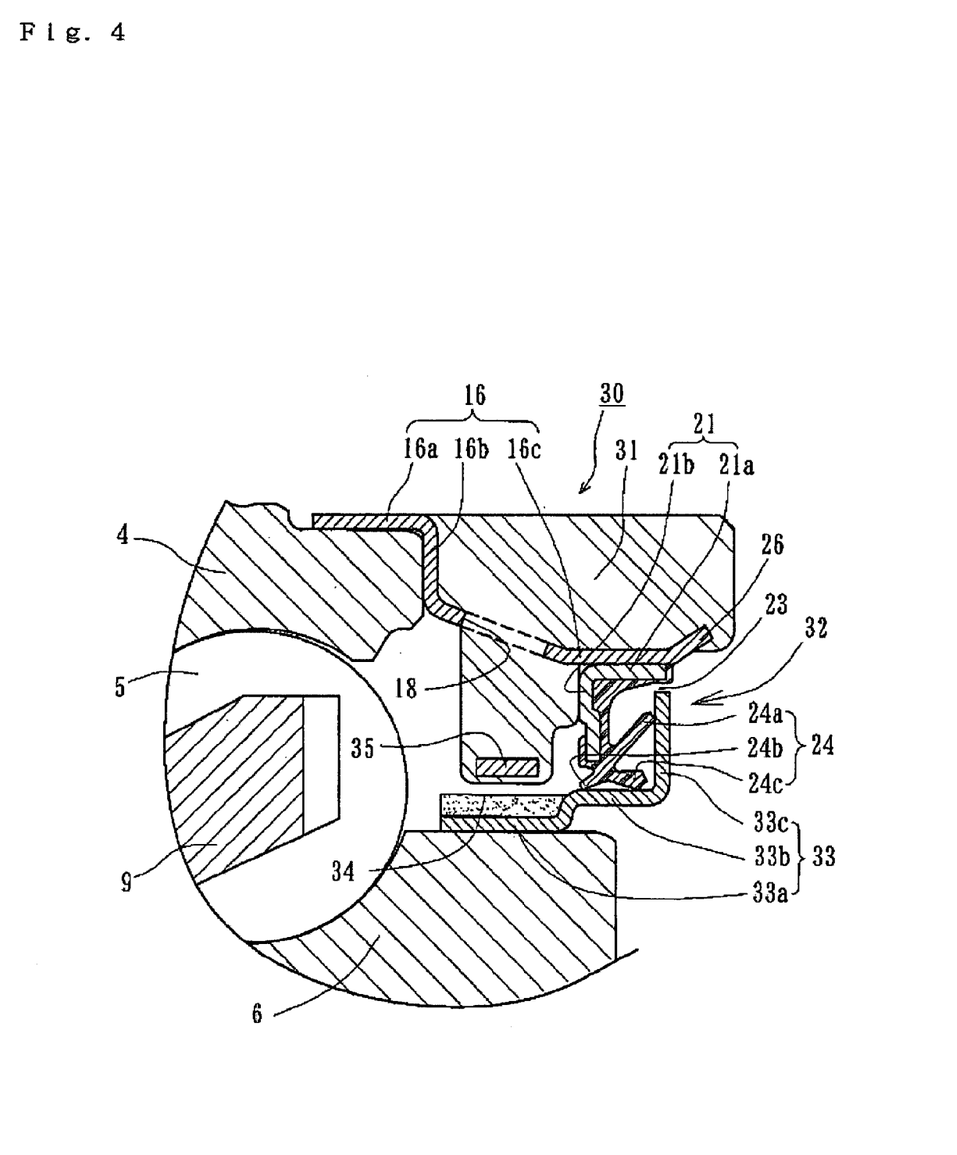
FIG. 4 is a partially enlarged longitudinal-section view of a third embodiment of a wheel bearing apparatus with a wheel speed detecting apparatus.

FIG. 4 is an enlarged view showing a third embodiment of the wheel bearing apparatus with a wheel speed detecting apparatus. This embodiment differs from the first embodiment (FIG. 2) only in the structure of the detecting portion. Accordingly, the same reference numerals are used in the third embodiment to designate the same parts performing the same functions of the parts used in the first embodiment.

A sensor holder 30 is formed with an annular configuration. The sensor holder 30 includes the annular fitting member 16 and a holding portion 31 integrated with the annular fitting member 16. The sensor holder 30 is mounted on the inboard end of the outer member 4. The holding portion 31 is formed from synthetic resin and integrally molded with the annular fitting member 16 by providing several apertures 18 on the cylindrical portion 16c of the annular fitting member 16. A wheel speed detecting sensor 35 is embedded within the holding portion 31. The sensor 35 is positioned opposite to a magnetic encoder 34, via a predetermined radial gap between the two. The wheel speed sensor 35 includes comprises a magnetic detecting element such as a Hall element, a magnetic resistance element (MR element) etc. which changes characteristics in accordance with the flowing direction of magnetic flux. Also, an IC, with a waveform shaping circuit to shape the output waveform of the magnetic detecting element, is incorporated with the sensor 35.

An inboard seal 32 includes first and second annular sealing plates 21 and 33. Each plate has a substantially "L"-shaped cross-sectional configuration and are mounted, respectively, on the sensor holder 30 and the inner ring 6 so that they face opposite toward each other. The second sealing plate 33 includes a cylindrical portion 33a fit onto the inner ring 6. Another cylindrical portion 33b, of larger diameter, extends axially from the cylindrical portion 33a. A standing portion 33c extends radially outward from the cylindrical portion 33b. The tip of the standing portion 33c opposes the cylindrical portion 21a of the first sealing plate 21, via a small radial gap, and forms a labyrinth seal 23. The second sealing plate 22 is made by press-forming a ferritic stainless steel sheet (JIS SUS 430 etc.) or preserved cold rolled sheet (JIS SPCC etc.).

The side lip 24a on the first sealing plate 21 is in sliding contact with the standing portion 33c of the second sealing plate 33. The grease lip 24b and medium lip 24c are in sliding contact with the cylindrical portion 33b of larger diameter of the second sealing plate 33. A magnetic encoder 34 is adhered, via vulcanized adhesion, on the outboard side surface of the cylindrical portion 33a. The magnetic encoder 34 is formed of an elastomer such as rubber etc. which includes mixed or mingled magnetic powder. The magnetic encoder 34 has N and S poles alternately arranged along its circumference direction. The magnetic encoder forms a rotary encoder to detect the wheel rotational speed.

The holding portion 31 is integrally molded with the annular fitting member 16. The wheel speed sensor 35 is embedded in the holding portion 31. The seal 32 is fit into the sensor holder 30 from the inboard side of the sensor 35. Thus, it is possible to prevent ingress of foreign matter, such as magnetic powder, into a space between the magnetic encoder and the detecting portion of the wheel speed sensor from the outside of the bearing apparatus although before the outer joint member 12 is inserted into the wheel hub 1, which includes a course where the bearing apparatus is transferred to an assemble line of an automobile manufacturer, and also under severe circumstances during real running of the vehicle.

The wheel bearing apparatus, with a wheel speed detecting apparatus, of the present disclosure can be applied to any type of the wheel bearing apparatus where the wheel speed detecting apparatus is self-contained, irrespective of use in a driving wheel or driven wheel having an inner ring rotational structure.

The present disclosure has been described with reference to the preferred embodiments. Obviously, modifications and alternations will occur to those of ordinary skill in the art upon reading and understanding the above detailed description. It is intended that the present invention be construed to include all such alternations and modifications insofar as they come within the scope of the appended claims or their equivalents.

What is claimed is:

1. A wheel bearing apparatus with a wheel speed detecting apparatus comprising:
    an outer member having an integrally formed body mounting flange, double row outer raceway surfaces formed on the inner circumferential surface of the outer member;
    an inner member including a wheel hub having an integrally formed wheel mounting flange at one end and a cylindrical portion axially extending from the wheel mount flange and an inner ring fit onto the cylindrical portion of the wheel hub;
    double row inner raceway surfaces formed on the outer circumferential surfaces of the wheel hub and inner ring, respectively, positioned opposite to the double row outer raceway surfaces;
    double row rolling elements arranged between the outer and inner raceway surfaces;
    an encoder mounted on the outer circumferential surface of the inner ring; and
    a sensor holder arranged on an end of the outer member opposite to the encoder, said sensor holder including an annular fitting member and a holding portion formed from synthetic resin molded integrally with the annular fitting member and a wheel speed detecting sensor embedded in said resin and positioned opposite to the encoder via a predetermined gap, said encoder has its characteristics varying alternately and equidistantly along its circumferential direction;

a seal arranged at an inboard side of the encoder, said seal including a first sealing plate and a second sealing plate fit, respectively, on the annular fitting member and the inner ring and arranged opposite to one another, and a tip end of the annular fitting member engaging the holding portion.

2. The wheel bearing apparatus according to claim 1 wherein the annular fitting member comprises a cylindrical fitting portion press fit onto an outer circumferential surface of the outer member, a flange portion extending radially inward from the fitting portion and adaptable to be contacted with the end face of the outer member, and a cylindrical portion extending axially from the flange portion, and wherein the first sealing plate is fit into the cylindrical portion.

3. The wheel bearing apparatus according to claim 1 wherein the tip end of the cylindrical portion of the annular fitting member is inclined and extends radially outward from the cylindrical portion, and wherein the plastic resin forming the holding portion is molded so that it envelopes the tip end of the cylindrical portion.

4. The wheel bearing apparatus according to claim 2 wherein the annular fitting member has an engaging portion extending radially outward from the cylindrical portion, and wherein the tip end of the engaging portion is caulked onto the holding portion after the holding portion has been molded onto the annular fitting member.

5. The wheel bearing apparatus according to claim 1 wherein the second sealing plate has a substantially "L" shaped cross-section having a cylindrical portion adapted to be fit onto the inner ring and a standing portion extending radially outward from the cylindrical portion, and wherein sealing lips of a sealing member mounted on the first sealing plate being in slidable contact with the second sealing plates.

* * * * *